US011271762B2

United States Patent
Achyuth et al.

(10) Patent No.: US 11,271,762 B2
(45) Date of Patent: Mar. 8, 2022

(54) SYSTEMS AND METHODS FOR VIRTUAL MEETINGS

(71) Applicant: Citrix Systems, Inc., Fort Lauderdale, FL (US)

(72) Inventors: Nandikotkur Achyuth, Bangalore (IN); Divyansh Deora, Bangalore (IN); Arnav Akhoury, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 145 days.

(21) Appl. No.: 16/408,591

(22) Filed: May 10, 2019

(65) Prior Publication Data

US 2020/0358628 A1 Nov. 12, 2020

(51) Int. Cl.
*G10L 15/00* (2013.01)
*H04L 12/18* (2006.01)
*H04N 7/15* (2006.01)
*G10L 13/00* (2006.01)
*G10L 17/00* (2013.01)

(52) U.S. Cl.
CPC .......... *H04L 12/1822* (2013.01); *G10L 13/00* (2013.01); *G10L 17/00* (2013.01); *H04N 7/152* (2013.01)

(58) Field of Classification Search
CPC ...................... G06Q 30/0641; G06Q 10/1095; G10L 13/00; G10L 17/00; G10L 13/04; G10L 13/086; G10L 15/00; G10L 15/26; H04L 12/1822; H04L 65/403; H04L 67/02; H04L 12/1827; H04L 63/0428; H04L 41/0816; H04L 65/1089; H04L 65/4015; H04L 65/605; H04L 67/18; H04L 67/303; H04N 7/152; H04N 5/23238; H04N 7/147; H04N 21/4223; G06F 16/254; G06F 16/3329; G06F 3/012; G06F 3/0482; G06F 16/54; G09G 3/32; H04M 3/568; H04M 3/4931; H04M 3/56; H04M 7/124; G06K 9/00221; G06K 9/00335
USPC ..... 358/400; 379/88.01, 205.01; 704/9, 205, 704/235, 260, 270.1, 275, 246, 270; 726/1; 709/205; 348/14.08; 715/728, 715/755
See application file for complete search history.

(56) References Cited

U.S. PATENT DOCUMENTS

| | | | | |
|---|---|---|---|---|
| 5,471,318 | A * | 11/1995 | Ahuja | H04L 12/1813 358/400 |
| 7,467,087 | B1 * | 12/2008 | Gillick | G10L 15/063 704/260 |
| 8,560,315 | B2 * | 10/2013 | Yasoshima | H04N 21/234336 704/246 |
| 8,781,841 | B1 * | 7/2014 | Wang | H04M 3/56 704/275 |
| 9,106,717 | B2 * | 8/2015 | Nicholson | H04L 65/1083 |
| 9,591,140 | B1 * | 3/2017 | Carlson | H04M 3/565 |
| 9,774,746 | B1 * | 9/2017 | Sennett | H04M 7/1245 |

(Continued)

*Primary Examiner* — Gerald Gauthier
(74) *Attorney, Agent, or Firm* — Banner & Witcoff, Ltd.

(57) ABSTRACT

Audio data associated with one of a plurality of users of a virtual meeting hosted by a virtual meeting application is received. The audio data is analyzed to identify another user of the virtual meeting. If another user is identified in the analyzed audio data, a setting of the virtual meeting application is adjusted to enable a client device for the identified user to receive audio input so as to facilitate a dialog among the users of the virtual meeting.

20 Claims, 10 Drawing Sheets

(56) References Cited

U.S. PATENT DOCUMENTS

| | | | |
|---|---|---|---|
| 9,967,520 B1* | 5/2018 | Rensburg | H04L 12/1822 |
| 10,296,954 B1* | 5/2019 | Mishra | G06Q 30/0641 |
| 10,491,857 B1* | 11/2019 | Huang | H04N 7/142 |
| 10,528,922 B1* | 1/2020 | Narayanaswamy | H04L 12/1818 |
| 11,036,387 B2* | 6/2021 | Karunamuni | G06F 3/0412 |
| 2003/0004728 A1* | 1/2003 | Keiller | G06F 3/16 704/275 |
| 2007/0285505 A1* | 12/2007 | Korneliussen | H04N 7/147 348/14.08 |
| 2008/0037720 A1* | 2/2008 | Thomson | H04M 3/4931 379/88.01 |
| 2008/0049922 A1* | 2/2008 | Karniely | H04L 65/403 379/205.01 |
| 2008/0320082 A1* | 12/2008 | Kuhlke | H04L 12/1822 709/205 |
| 2013/0231917 A1* | 9/2013 | Naik | G10L 13/08 704/9 |
| 2014/0068704 A1* | 3/2014 | Grewal | G06F 21/606 726/1 |
| 2014/0280602 A1* | 9/2014 | Quatrano | H04L 67/02 709/205 |
| 2014/0365216 A1* | 12/2014 | Gruber | G10L 15/063 704/235 |
| 2014/0379351 A1* | 12/2014 | Raniwala | G06K 9/00335 704/270 |
| 2015/0033130 A1* | 1/2015 | Scheessele | G06F 3/013 715/728 |
| 2015/0154960 A1* | 6/2015 | Al | H04L 12/1827 704/246 |
| 2016/0094355 A1* | 3/2016 | Waltermann | H04L 12/1822 715/755 |
| 2016/0277242 A1* | 9/2016 | Sallam | H04L 12/1831 |
| 2016/0277455 A1* | 9/2016 | Xi | H04L 65/403 |
| 2016/0285929 A1* | 9/2016 | Oganezov | H04L 65/1093 |
| 2016/0315842 A1* | 10/2016 | Boss | H04L 65/80 |
| 2018/0124136 A1* | 5/2018 | Faulkner | H04L 65/4015 |
| 2018/0204576 A1* | 7/2018 | Dhoot | G10L 17/00 |
| 2019/0189117 A1* | 6/2019 | Kumar | H04L 51/02 |
| 2020/0110572 A1* | 4/2020 | Lenke | H04N 7/15 |
| 2020/0304547 A1* | 9/2020 | Lu | H04L 65/1089 |
| 2020/0358628 A1* | 11/2020 | Achyuth | G10L 17/00 |
| 2021/0097599 A1* | 4/2021 | Sandow | G06Q 10/06398 |
| 2021/0109904 A1* | 4/2021 | Kasi | G06F 16/21 |
| 2021/0111302 A1* | 4/2021 | Pan | H01L 33/30 |
| 2021/0218845 A1* | 7/2021 | Magi | H04N 7/155 |

* cited by examiner

430

| Database of Names |||
|---|---|---|
| Alias/Name | User ID | Job Title/Dept |
| James | James.smith@companyX.com | Software Engineer |
| Jim | James.smith@companyX.com | Software Engineer |
| Fred | Fred.jones@companyX.com | Human Resources |
| Elizabeth | Liz.amerson@companyX.com | Systems Engineer |
| Nancy | Nancy.eng@companyY.com | Manager, IT Dept. |

| | | |
|---|---|---|
| Username: | Fred.jones@companyX.com | 610 |
| Job Title: | Human Resources Assistant | 620 |
| Enter Aliases That You Go By Here: | Fred<br>Freddy<br>Jonesy | 630 |
| Enter your last name | Jones | |
| Appls. Used | Microsoft Outlook<br>Google Calendar<br>Microsoft Excel | 640 |

*FIG. 6*

SYSTEMS AND METHODS FOR VIRTUAL MEETINGS

FIELD

Aspects described herein generally relate to computer hardware and software. In particular, one or more aspects of the disclosure generally relate to hosting and management of virtual meetings.

BACKGROUND

In a virtual meeting such as a video teleconference, typically one attendee speaks at any given moment in time, whereby the rest of the attendees have their audio muted. This is done to make sure each speaker can be clearly heard by the other attendees of the teleconference. This is the case whether the virtual meeting is an audio teleconference conducted over the telephone, or whether the virtual meeting is a video teleconference in which both audio and video data is streamed to each of the attendees of the teleconference.

In some video teleconferences, such as SKYPE™, the video feed of the current speaker takes up a larger area on a display screen as compared to the other non-speakers attending the video teleconference. This is to allow all attendees to focus on the current speaker, and to be able to view any material that the current speaker may want to show to the other attendees.

SUMMARY

Aspects of the disclosure relate to various systems and techniques that provide for a method and apparatus for managing controls or tasks to conduct a virtual meeting based on audio obtained during the virtual meeting. For example, based on analysis of audio obtained from a current speaker of the virtual meeting, another attendee of the virtual meeting may have his/her audio automatically unmuted, or a task may be automatically created for the virtual meeting attendee.

At least one aspect is directed to a method that comprises receiving audio data associated with one of a plurality of users of a virtual meeting hosted by a virtual meeting application. The method also comprises analyzing the received audio data to identify another user of the virtual meeting. The method further comprises adjusting a setting of the virtual meeting application to enable a client device for the identified user to receive audio input so as to facilitate a dialog among the users of the virtual meeting.

In other aspects, the method may be embodied in computer-readable instructions or executed by a data processing system.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 5A depicts entries in an exemplary names/alias database in accordance with one or more illustrative aspects described herein.

FIG. 6 depicts an illustrative teleconference registration menu in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

There is a need to provide a mechanism to enable attendees of a virtual meeting to perform tasks assigned to them during the virtual meeting. There is also a need to assist attendees of a virtual meeting to allow them to act on the tasks that have been assigned to them during the virtual meeting.

During a virtual meeting, the unmuting of audio to allow a current speaker to speak, while at the same time muting all other attendees of the virtual meeting, requires fairly complex software as well as requiring a user input from at least one of the attendees of the virtual meeting to a virtual meeting user interface, wherein that user input determines which virtual meeting attendee is to be the next speaker. Also, during a virtual meeting, tasks assigned to an attendee require that attendee to take careful notes during the virtual meeting, which may lead to that attendee missing out on a portion of what a current speaker is discussing.

Aspects described herein provide a mechanism for automatically unmuting a next speaker of a virtual meeting based on analyzed speech of a current speaker of the virtual meeting. Other aspects described herein provide a mechanism for automatically creating a task for an attendee of a virtual meeting based on analyzed speech of a current speaker of the virtual meeting.

As a general introduction to the subject matter described in more detail below, aspects described herein are directed towards receiving audio from a virtual meeting attended by a plurality of attendees, performing analysis of the audio to determine whether the audio corresponds to a particular command or request, and causing an action to be performed for an attendee of the virtual meeting based on the analyzed audio matching information stored in a database of names and a database of phrases.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," and similar terms, is meant to include both direct and indirect mounting, connecting, and coupling.

Figure 1:
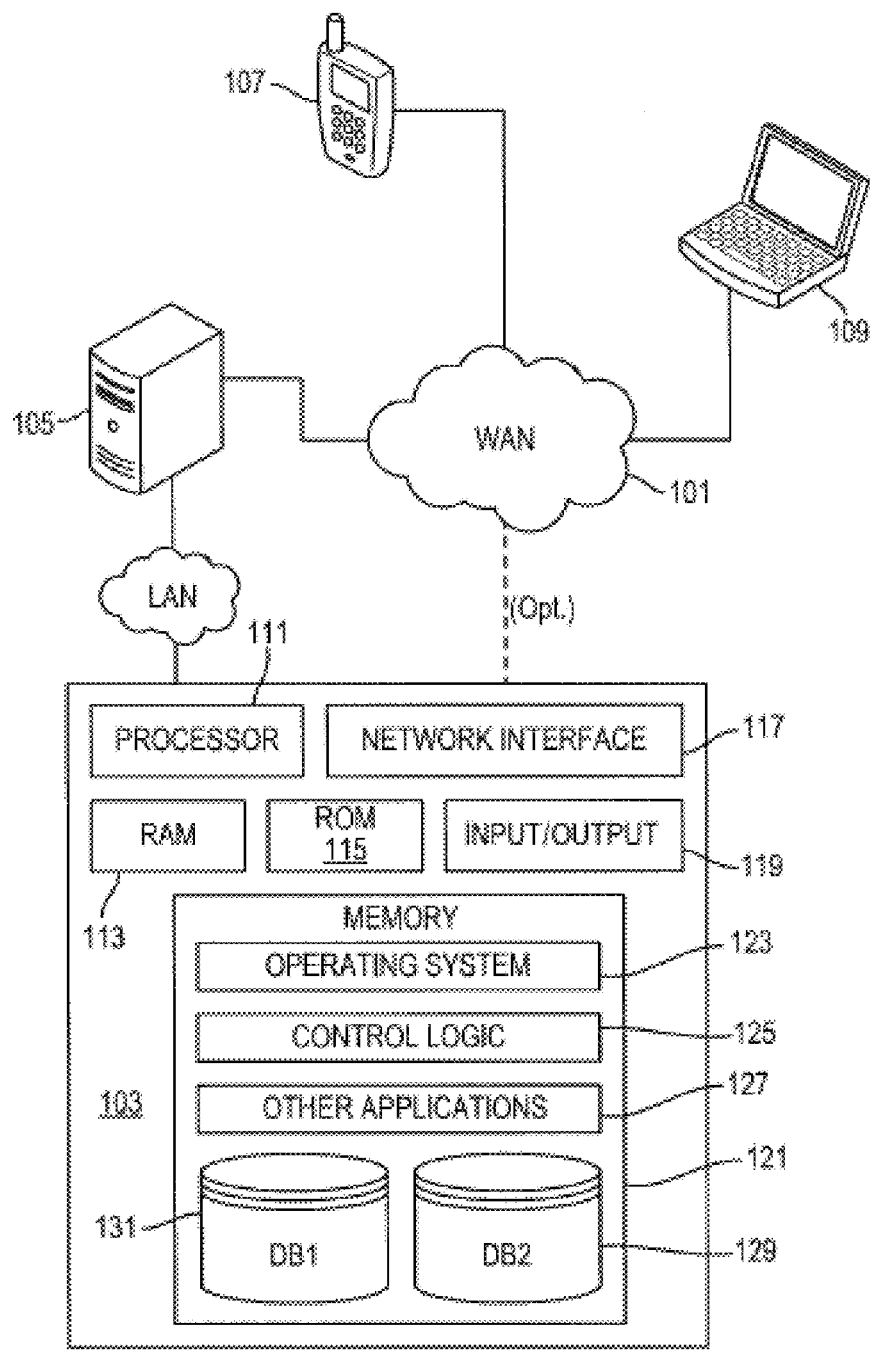
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database DB1 and a second database DB2. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
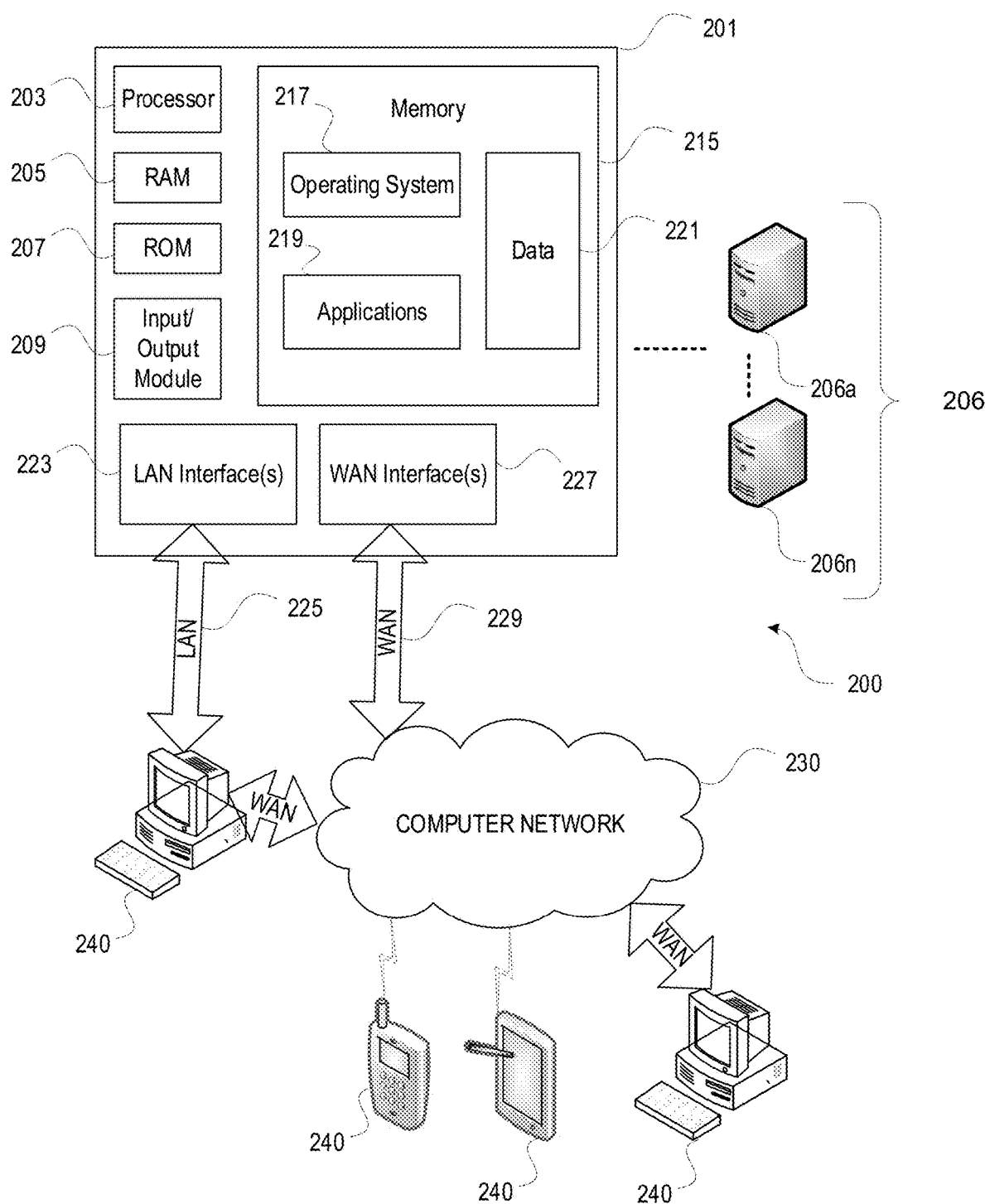
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc., or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments, the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) or Transport Layer Security (TLS) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101. The data may correspond to audio and video data associated with a teleconference that the one or more clients 240 are attending, for example. In one implementation, GoToMeeting™ is a video teleconference application used by each of the clients 240, to enable the setting up and creation of a video teleconference attended by each of the clients 240.

Figure 3A:
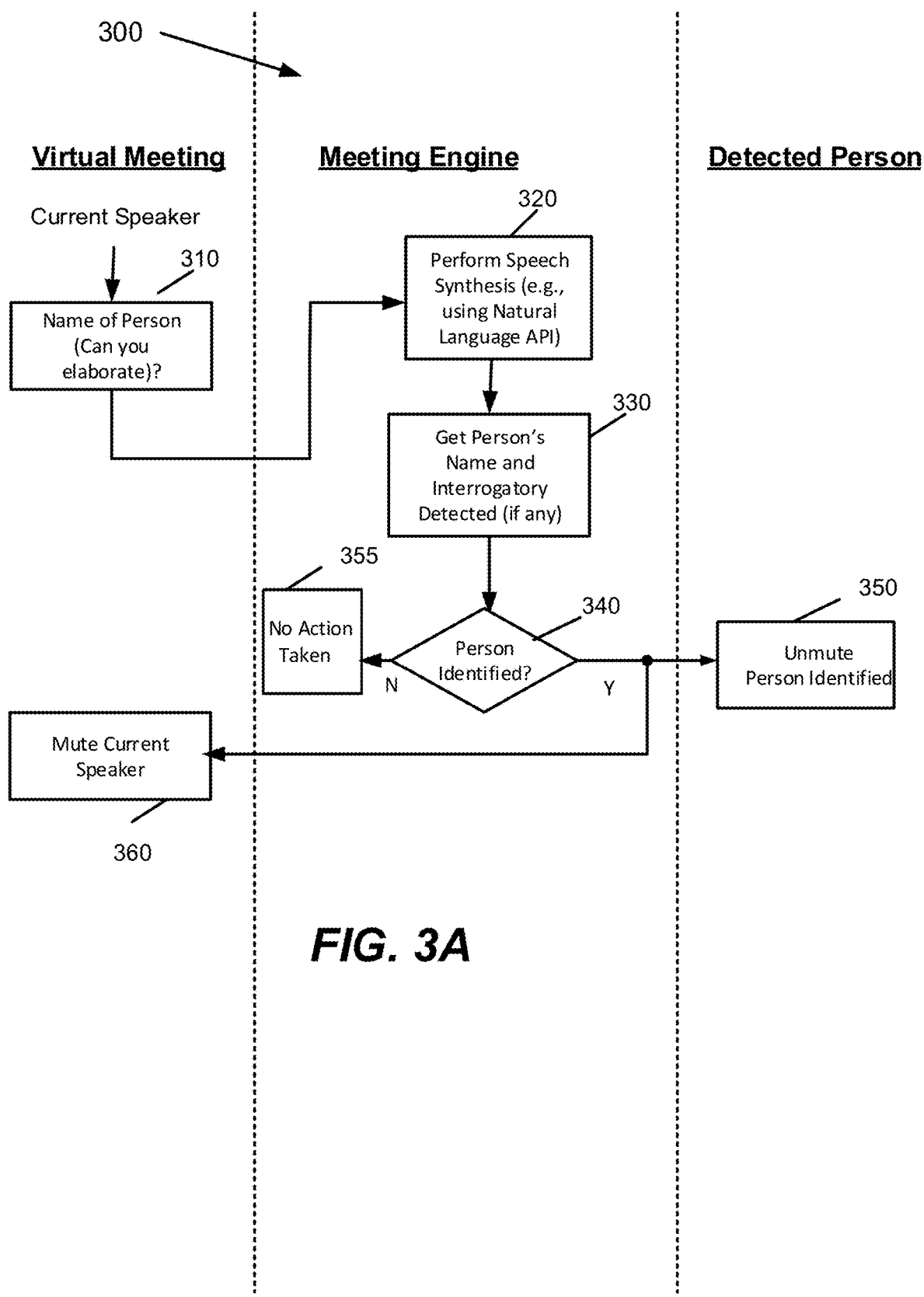
FIG. 3A depicts a flow diagram that illustrates a method that unmutes a teleconference attendee based on analyzed speech of the teleconference, in accordance with one or more illustrative aspects described herein.
Figure 4:
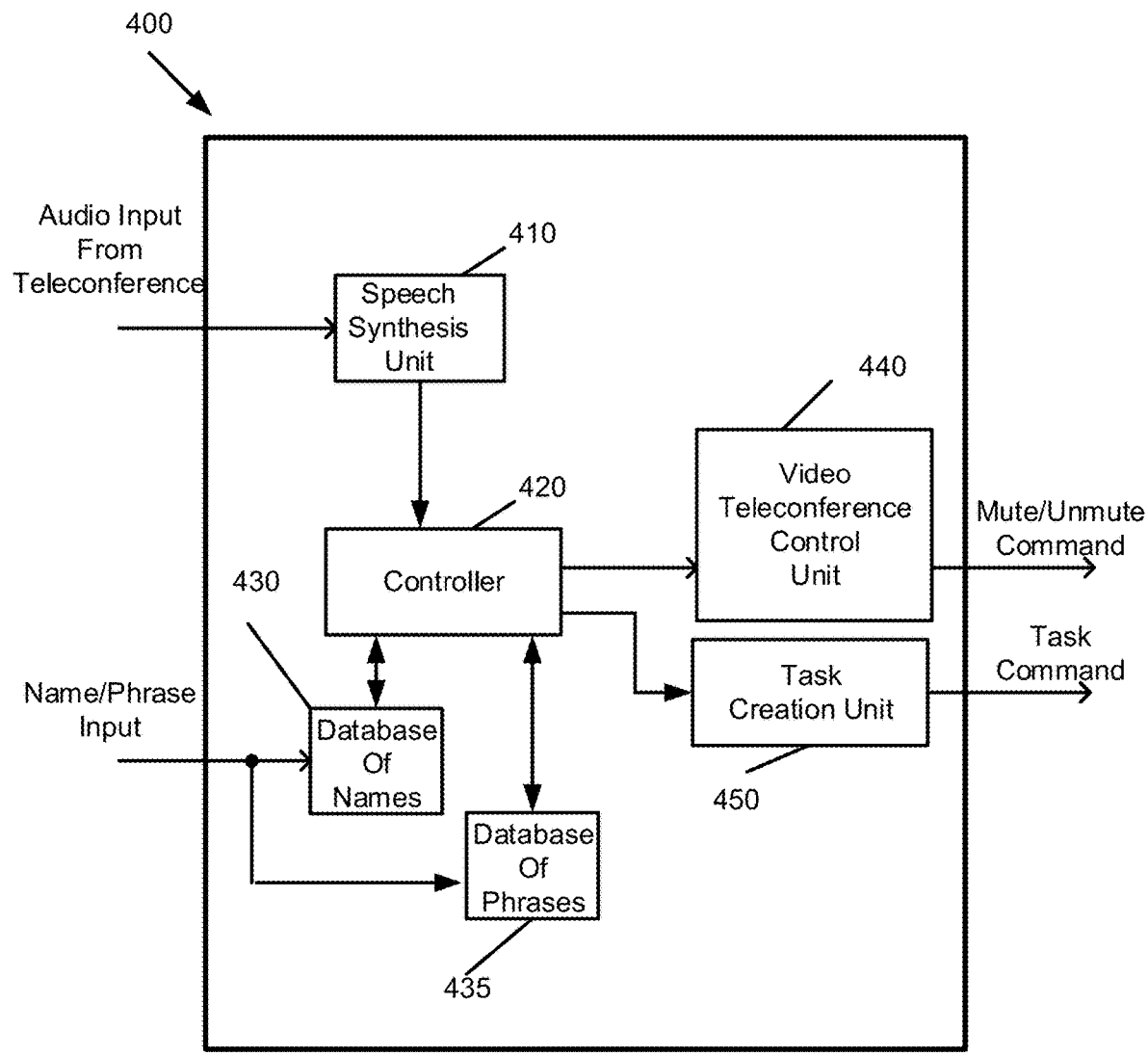
FIG. 4 depicts elements of a computer system for hosting a virtual meeting in accordance with one or more illustrative aspects described herein.

FIG. 3A depicts a flow diagram that illustrates a method 300 that unmutes audio of a teleconference attendee based on analyzed speech of the teleconference, in accordance with one or more illustrative aspects described herein, with steps shown being associated with a current speaker of a virtual meeting, with steps shown being associated with a meeting engine, and with steps shown being associated with a detected person attending the virtual meeting. FIG. 4 depicts elements of a meeting engine 400 that is configured to unmute a virtual meeting attendee a based on analyzed speech of the virtual meeting, in accordance with one or more illustrative aspects described herein. The meeting engine 400 may be provided on a client device of a virtual meeting attendee, such a client machine 240 in FIG. 1, or the meeting engine 400 may be provided on a server that controls operation of the virtual meeting, such as server 206 in FIG. 2, whereby the server may be accessible to client devices of each of the virtual meeting attendees via a network such as a WAN, a LAN, or the Internet. In some aspects, the meeting engine 400 may be performed entirely by software, and in other aspects the meeting engine 400 may be performed by a combination of software and hardware (e.g., software that outputs commands that cause a piece of hardware, such as a switch, to mute/unmute a microphone of a virtual meeting attendee).

With reference to both FIG. 3A and FIG. 4, in step 310, a current speaker in a virtual meeting, such as an audio or video teleconference, speaks. The speech is input in step 320 to a speech synthesis unit 410, which may perform natural language processing (NLP) on the speech to obtain information associated with the speech. By way of example, Named Entity Recognition (NER) algorithm may be used as an NLP technique by the speech synthesis unit 410 to determine whether the speech contains any names followed by an interrogatory (a question), as obtained in step 330. A controller 420 may receive the output of the speech synthesis unit 410, and, based on the name and the phrase obtained by the speech synthesis unit 410 matching one of a plurality of names stored in a database of names 430 and one of a plurality of phrases stored in a database of phrases 435, the controller 420 may output a command to either a video conference control unit 440 or a task creation unit 450. The database of names 430 and the database of phrases 435 may be stored, for example, in memory 121 of data server 103 shown in FIG. 1 or in memory 215 of computing device 201 shown in FIG. 2. The matching of names and phrases may be a complete match in some aspects, or it may be a partial match in other aspects (e.g., synthesized audio data corresponding to "Jimbo" may be considered to be a partial match for the name "Jim" stored in the database of names 430, based on the similar sound of the words). The names stored in the database of names 430 may include first names, last names, and nicknames, whereby a match to any of these names results in a "hit" to an entry of the database of names 430. The phrases stored in the database of phrases 435 may include phrases directed to tasks, and may include phrases such as "set up a meeting", "perform a job", "do this project", or other interrogatory phrases.

Tasks that may be created by the task creation unit 450 may be calendar creation tasks or other type of tasks such as a task for a virtual meeting attendee to create an expense report (whereby an expense report shell using the Microsoft Excel™ application may be provided to that attendee). In other aspects, a reminder may be created by the task creation unit 450 based on something that was discussed during the virtual meeting, whereby that reminder may pop-up on a display of the virtual meeting attendee's computing device at some later point in time after the virtual meeting has ended (e.g., one hour later, one day later, one week later, two weeks later), to thereby remind that person about the task assigned to him/her during the virtual meeting.

In step 340, if the name obtained in step 330 matches a name stored in the database of names 430, the virtual meeting attendee that matches the name obtained in step 330 has his/her audio unmuted in step 350, whereas the current speaker has his/her audio muted in step 360. This corresponds to the outputs of mute/unmute commands by the video teleconference control unit 440 in FIG. 4. In step 340, if the name obtained in step 330 does not match a name stored in the database of names 430, then the method proceeds to step 355 in which no action is taken, and the method ends.

Figure 3B:
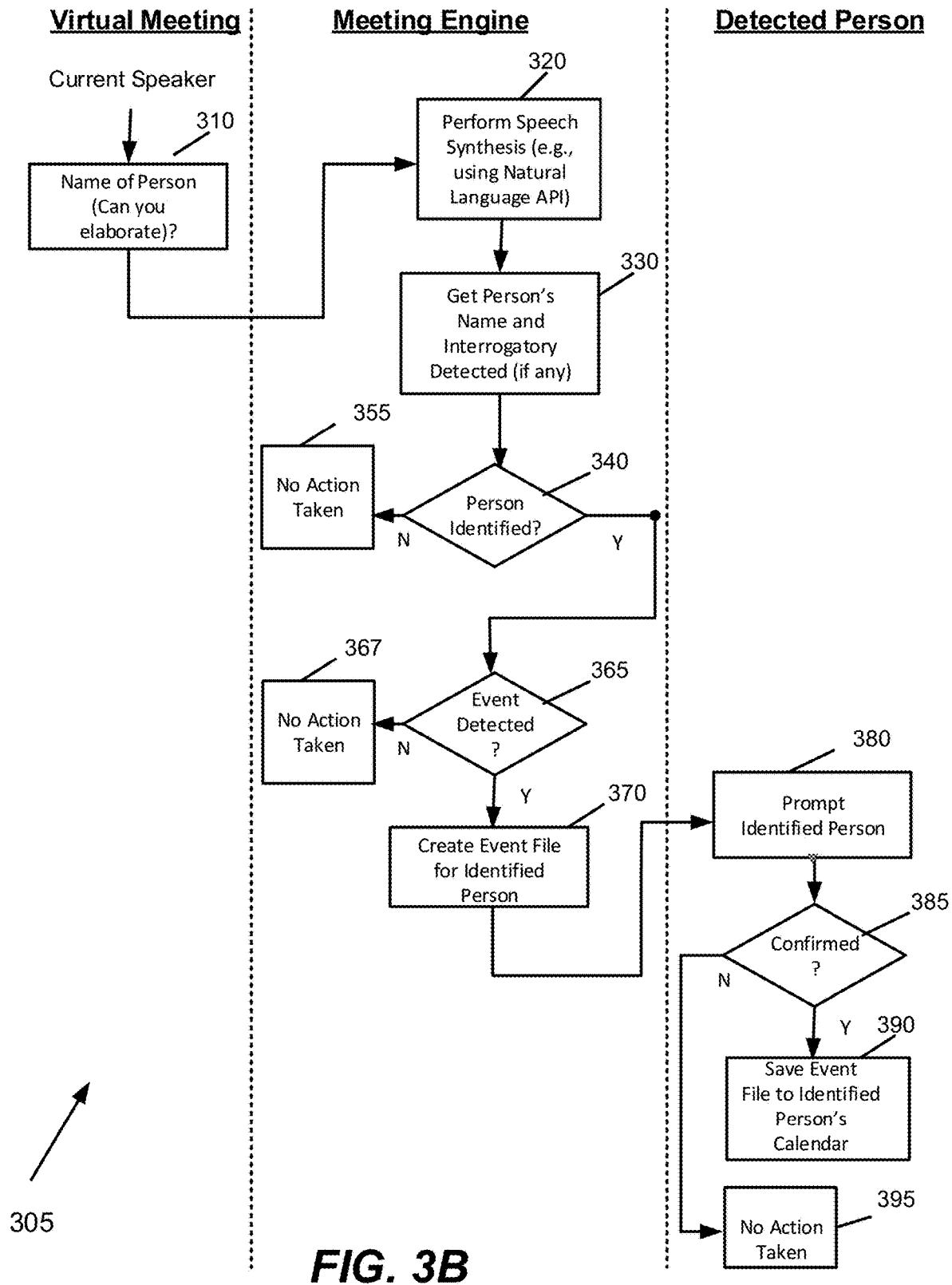
FIG. 3B depicts a flow diagram that illustrates a method that creates a task for a teleconference attendee based on analyzed speech of the teleconference, in accordance with one or more illustrative aspects described herein.

FIG. 3B depicts a flow diagram that illustrates a method 305 that creates a task for a teleconference attendee based on analyzed speech of the teleconference, in accordance with one or more illustrative aspects described herein. Steps 310, 320, 330, 340 and 355 are similar to those described above with respect to the method 305 of FIG. 3A, and will be repeated below for ease of explanation of method 305.

With reference to both FIG. 3B and FIG. 4, in step 310, a current speaker in a virtual meeting, such as an audio or video teleconference, speaks. The speech is input in step 320 to a speech synthesis unit 410, which may perform natural language processing (NLP) on the speech to obtain information associated with the speech. The speech synthesis unit 410 determines whether the speech contains any names followed by an interrogatory or an inquiry (e.g., a question), as obtained in step 330. A controller 420 may receive the output of the speech synthesis unit 410, and, based on the name and the phrase obtained by the speech synthesis unit 410 matching one of a plurality of names stored in a database of names 430 and one of a plurality of phrases stored in a database of phrases 435, the controller 420 may output a command to either a video conference control unit 440 or a task creation unit 450.

In step 340, if the name obtained in step 330 matches a name stored in the database of names 430, the method proceeds to step 365 to determine if an event has been detected. If the name obtained in step 330 does not match a name stored in the database of names 430, then the method proceeds to step 355 in which no action is taken, and the method ends.

If the name identified in step 330 matches a name of an attendee of the virtual meeting, then in step 365, a determination is made as to whether a particular event has been detected. The event may match one of a plurality of events associated with phrases stored in the database of phrases 435. For example, if the speech obtained in step 320 corresponds to "Jim, please set up a telephone conference for Tuesday, Oct. 10, 2020", then if the name "Jim" obtained from the analyzed audio of the virtual meeting matches a name/alias of an attendee of the virtual conference (as determined in step 330), and the phrase "set up telephone conference" obtained from the analyzed audio of the virtual meeting matches a phrase stored in the database of phrases 435, then the process proceeds to step 370, to create an event file. The event file created in step 370 may correspond in some aspects to a calendar invite file, such as a .iso file utilized by many different calendar applications, such as Microsoft Outlook, Google Calendar, Asana, Calendy, Teamup, or Teamweek. This corresponds to the output of a task command by the task creation unit 450 in FIG. 4. In other aspects, the event file created in step 370 may correspond to a Microsoft Excel™ spreadsheet that may be automatically opened up on a computing device of a virtual meeting attendee, to assist a virtual meeting attendee in creating, for example, an expense report based on an expense report task assigned to the virtual meeting attendee during the virtual meeting. In other aspects, the event file created in step 370 may be a "reminder" email or a "reminder "text" that may be automatically sent to the virtual meeting attendee at some later point in time after the end of the virtual meeting, such as one hour later, one day later, and/or one week later, to thereby reminder the virtual meeting attendee of the task that was assigned to him/her during the virtual meeting.

On the other hand, if the name "Jim" obtained from the analyzed audio of the virtual meeting matches a name/alias in the database of names 430 of an attendee of the virtual conference (as determined in step 330), and the phrase obtained from the analyzed audio of the virtual meeting does not match a phrase stored in the database of phrases 435 in FIG. 4, then the method ends in step 367 with no action taken (and thus an event file is not created). For example, if the analyzed audio obtained in step 320 corresponds to "Hi, Jim, how is your family doing", this phrase is detected as an inquiry and having an attendee (Jim), but since the phrase "how is your family doing" does not match any phrases that would result in an event to be created for the attendee Jim, no action is taken. As another example, assume the unmuted speaker Fred says "Jim, please set up a follow-up meeting for Friday, May 11." In this case, a NER algorithm used by the speech synthesis unit 410 may parse that sentence by detecting "Jim" as a person's name, "meeting" as a key word, and "Friday, May 11" as a date/time. From that information, and assuming that a name or alias exists in the database of names 430 for a virtual meeting attendee matching the name "Jim", then a pop-up window may be displayed on a computing device of the attendee "Jim", to prompt him to confirm a calendar invite to the virtual meeting attendees in step 380 to be discussed below.

In step 380, after the event file has been created in step 370, the user is prompted, such as by way of pop-up window provided on a display of the user's computer, to perform an action associated with the event created in step 370. In step 385, if the user confirms acceptance of the event created in step 370, the event created is saved to the user's calendar in step 390, and the process ends. If instead the user does not confirm acceptance in step 385 of the event created in step 370, then the event created is not saved to the user's calendar, and the method ends with no further action being taken as indicated by step 395. As discussed above, the event created may be something other than a calendar invite, such as the creation of an email reminder, the creation of a text reminder, or the opening of another application on the user's computing device. For example, a Microsoft Excel™ spreadsheet may be automatically opened up on the display of a virtual meeting attendee to assist him/her in the creation of an expense report based on a task assigned to the virtual meeting attendee by another virtual meeting attendee.

FIG. 5A depicts entries in an exemplary database of names 430, which may be used to unmute a teleconference attendee or to create a task for the teleconference attendee based on analyzed speech of the teleconference, according to one or more aspects. The database 430 includes a first field 510 corresponding to an Alias/Name, a second field 520 corresponding to a User ID associated with the Alias/Name, and a third field 530 corresponding to the job title or department associated with the User ID. The database of names 430 may be populated by a network administrator, for example, or it may be populated by the collection of registration information for each of the virtual meeting attendees when those virtual meeting attendees initially registered onto a virtual meeting application, as described below with respect to FIG. 6.

Figure 5B:
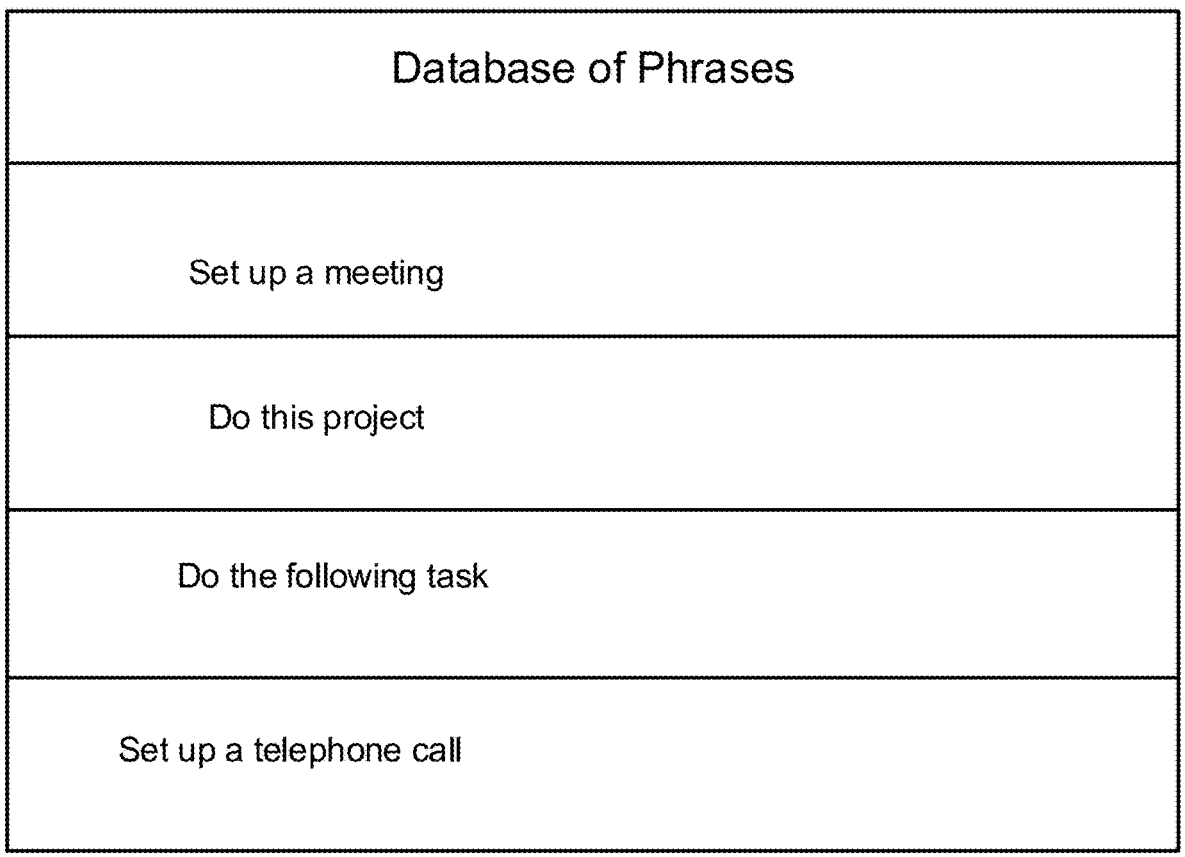
FIG. 5B depicts entries in an exemplary phrases database in accordance with one or more illustrative aspects described herein.

FIG. 5B shows an exemplary database of phrases 435, such as "set up a meeting", "do this project", "set up a telephone call", "do the following task", whereby these phrases, when detected by the speech synthesis unit 410, result in the creation of an event directed a virtual meeting attendee. In a similar manner, the database of phrases 435 may be populated by a network administrator, or by a supervisor or manager familiar with typical phrases used to assign tasks to employees.

FIG. 6 depicts an illustrative teleconference registration menu 600 that enables a registrant to enter information of the registrant to be used to automatically unmute the registrant during a teleconference or that automatically assigns a task to the registrant during a teleconference, according to one or more aspects. The menu 600 may be provided to a participant in a virtual meeting either when the participant initially registers with a virtual meeting application, such as when a user initially registers with the application. Alternatively, the menu 600 may be provided to a participant in a virtual meeting at the start of a virtual meeting that the user is participating in. The menu 600 includes a first region 610 by which a registrant enters his/her username. The menu 600 also includes a second region 620 by which the registrant enters his/her job title. The menu 600 further includes a third region 630 by which the registrant enters his/her last name, and any aliases and other names he/she goes by. The menu 600 still further includes a fourth region 640 by which the participant indicates the applications, such as calendar applications, email applications, and/or text applications, that are on his/her computer. With reference to FIG. 5A and to FIG. 6, the entries entered in the menu 600 as shown in FIG. 6 may be used to populate the third field 530 of the database of names/phrases 430 as shown in FIG. 5A. The information entered in the fourth region 640 of the menu 600 as shown in FIG. 6 may be used, for example, to determine the correct format of a calendar file (e.g., a .ics file) to create based on a calendar invite request made during a virtual meeting by one participant to another participant to set up a future virtual meeting. Alternatively, the invite request may be an email invite, a text invite, or some other type of invite.

Figure 7:
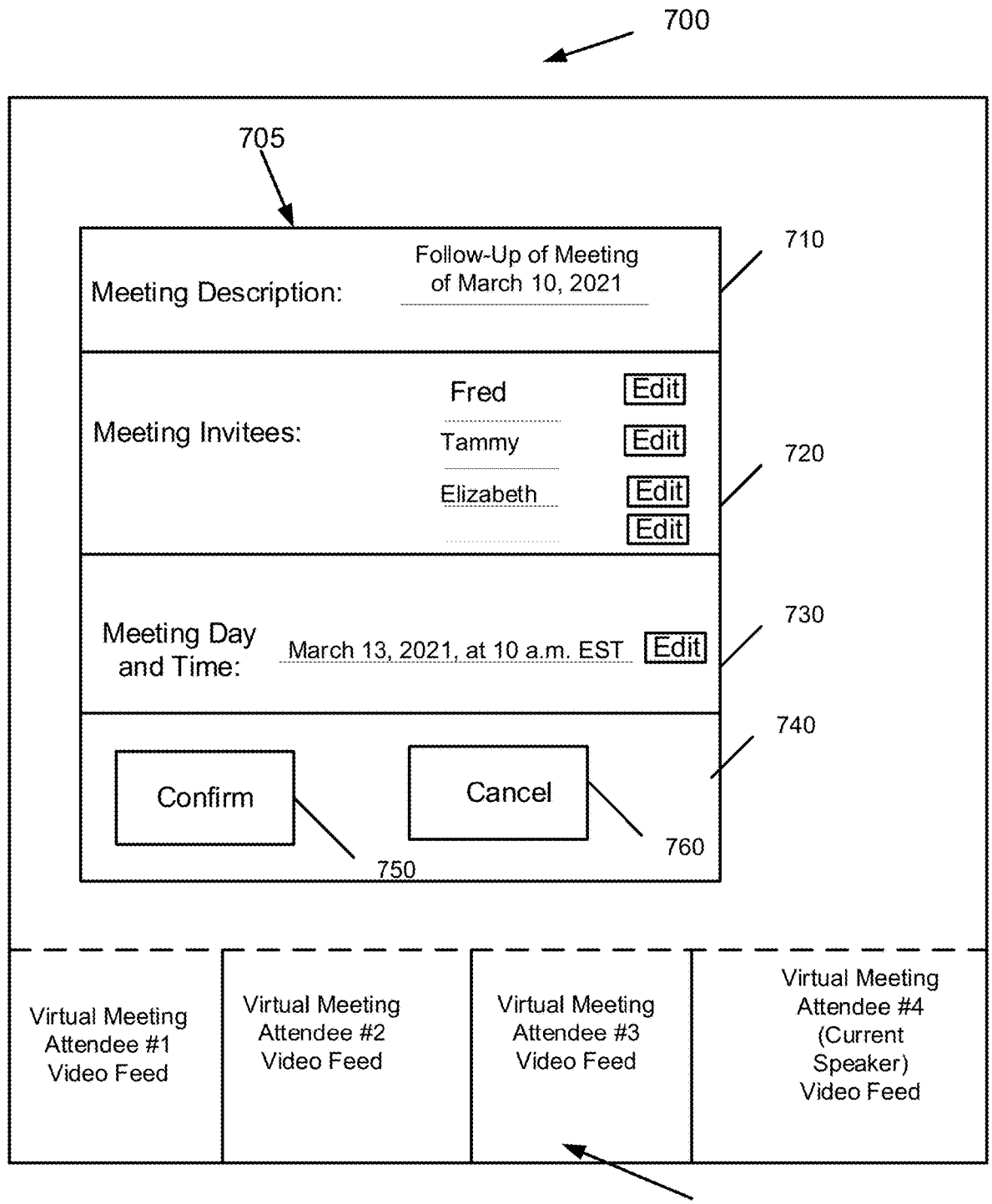
FIG. 7 depicts an exemplary pop-up window that may be provided on a computer display of a teleconference attendee based on analyzed speech of the teleconference, in accordance with one or more illustrative aspects described herein.

FIG. 7 depicts an exemplary pop-up window 705 that may be provided on a computer display 700 of a teleconference attendee based on analyzed speech of the teleconference, in accordance with one or more aspects. Pop-up window 705 includes a first field 710 populated with information corresponding to a meeting description. In the example shown in FIG. 7, based on synthesized speech obtained from a speaker of a virtual meeting conducted on Mar. 10, 2021, it was determined that the speaker requested that another participant in the virtual meeting, Jim, set up a follow-up meeting for Mar. 13, 2021. As such, the text "follow-up of meeting of Mar. 10, 2021" may be automatically populated in the first field 710 of the pop-up window 705 provided on a display 700 of a computing device used by participant Jim. Also, the second field 720 of the pop-up window 705 may be automatically populated with each of the participants in the Mar. 10, 2021 virtual meeting, whereby edit buttons are provided in the second field 720 to enable the user to make any changes to the meeting invitees populated in the pop-up window 705 based on the analyzed audio data of the virtual meeting. By way of example, if the analyzed audio obtained from a current speaker of the virtual meeting is "Jim, please setup a meeting with you, Suzy, Sharon and Tom for next week", the pop-up window 705 provided on a display 700 of Jim's computing device may include "Jim", "Suzy", "Sharon", and "Tom" as invitees for an upcoming virtual meeting to be created by Jim using the information provided in the pop-up window 705. In another example, if the analyzed audio obtained from a current speaker of the virtual meeting is "Jim, please setup a meeting with you, Suzy, Sharon and HR for next week," then the pop-up window 705 provided on a display 700 of Jim's computing device may include "Jim", "Suzy", "Sharon", and each person who has "HR" (i.e., "human resources") as his/her job title in the database of names 430 as invitees for an upcoming virtual meeting to be created by Jim using the information provided in the pop-up window 705. Note that some or all of the invitees to a future virtual meeting to be invited by Jim may not be attendees of the current virtual meeting in which this task has been assigned to Jim by the current speaker.

Further, the third field 730 of the pop-up window 705 may be automatically populated with text corresponding to the day and time of day for the virtual meeting to be set up by the participant Jim, as well as the location of the meeting (if applicable) and any resources needed for the meeting (e.g., a whiteboard, a laser pointer, etc.). That way, the participant Jim can easily set up a future virtual meeting based on information obtained during the current virtual meeting that Jim is participating in, whereby that information corresponds to a request made to Jim by another participant in the current virtual meeting. The third field 730 includes an edit button to enable the user to make any changes to the information populated in the third field 730 based on the analyzed audio data of the virtual meeting. The pop-up window 705 also includes a fourth field 740, in which a user may either click on a "Confirm" button 750 to save the current contents of the pop-up window 705, or the user may click on a "Cancel" button 760 to cancel the current contents of the pop-up window 705. If the user selects the "Confirm" button 750, then the current contents within the pop-up window 705 are used to create calendar invites to each of the meeting invitees included in the second field 720 of the pop-up window 705. If the user selects the "Cancel" button 760, then the user has decided to not create a future virtual meeting based on the information shown in the pop-up window 705, whereby the user may decide at some later point in time to create a calendar invite on his/her own, without the assistance of the information automatically populated into the pop-up window 705 In FIG. 7, the pop-up window 705 is shown as being displayed on a portion of the display 700 of the user's computing device separate from a virtual meeting display region 770 at the bottom portion of the display 700, whereby the user can then readily see real time video of each of the attendees of the virtual meeting, while at the same time being able to act on a task given to the user by an attendee of the virtual meeting.

In some aspects, instead of instantaneously providing a pop-up window to a virtual meeting attendee based on speech of a current speaker that has just been analyzed by the speech synthesis unit 410, a delay mechanism or timer may be utilized to delay the display of the pop-up window 700 on the display of a computing device of the participant Jim, such as a one minute to two minute delay from when a task has been assigned to Jim by the current speaker. That way, if the current speaker happens to modify a task from the time when the current speaker initially spoke of a task to be assigned to Jim, that task modification may be detected by the speech synthesis unit 410, and the pop-up window 705 displayed on the display 700 of Jim's computing device may be provided with the updated task information regarding a task to be assigned to Jim by the current speaker. For example, if the current speaker says "Jim, set up a meeting with you and Fred for next Tuesday at 2:00 p.m.", and then 30 seconds later the current speaker says "Jim, let's change that meeting time with you and Fred to 4 p.m. on Tuesday", instead of providing a first pop-up window 705 with the Tuesday, 2:00 p.m. meeting date and time to the display of Jim's computing device, and then sending a second pop-up window 705 with the Tuesday, 4:00 p.m. meeting date and time to Jim's computing device, the delay mechanism or timer may instead collect the speech input by the current speaker, and whereby only one pop-up window 705 with the correct "Tuesday, 4:00 p.m." meeting date and time may appear on the display of Jim's computing device.

If at least two virtual meeting participants have associated themselves with a same name or alias, such as the name "Jim" for the virtual meeting participant "James Smith" and for the virtual meeting participant "James Henderson", then it may not be clear which of the two participants the request "Jim, please explain the software update that was performed last week" is meant for, and thus it may not be clear which of the two participants to automatically unmute their audio to enable that person to speak during the virtual meeting. According to some aspects, based on the context of the speech made by the speaker, in this case the speech being associated with "software", the third field 530 of the database of names 430 in FIG. 5 may be parsed to determine which of the two "Ems" is to have their audio unmuted. In FIG. 5, since the participant "Jim" associated with user ID james.smith@companyX.com has a job title of "software engineer" in the third field 530 of that data entry in the database of names 430, the audio of participant "Jim" associated with user ID james.smith@companyX.com is unmuted to thereby enable that participant to speak during the virtual meeting, whereas the audio of another participant "Jim" associated with another user ID, whose job title is a billing coordinator, is not unmuted. In other aspects, information such as office location, residence (e.g., city, state), time with the company (e.g., seniority) may be stored in the database of names 430 and used to determine which virtual meeting attendee from a plurality of candidate virtual meeting attendees that a current task is meant to be assigned to.

If instead it is not clear which participant the request is made for, such as in the example above whereby both "Jims" are software engineers, then both participants "Jim" may be provided with a pop-up display requesting that person to confirm that they are indeed the person to whom the request has been made. That way, the correct "Jim" will confirm that the request was directed to him, whereas the other "Jim" will not confirm (and thus ignore the pop-up display, or click "Not Me") that the request was directed to him. The person who confirms that he/she is the person to whom the request was made will have his/her audio automatically unmuted, and the person or persons to whom the request was not directed to will not their respective audio automatically unmuted.

Besides providing automatic unmuting of a virtual meeting participant or providing the virtual meeting participant with a prefilled calendar invite based on a request made by another virtual meeting participant, an action may be automatically performed based on the specifics of the analyzed speech of a participant. For example, if a request made by a virtual meeting participant is detected by the speech synthesis unit 410 in FIG. 4, in which that request is for the computer display of another participant to be displayed to all virtual meeting participants, such as the phrase "Nancy, please show us the spreadsheet that you are working on right now" being detected by the speech synthesis unit 410, then if "Nancy" shows up in the database of names 430 as being a current virtual meeting participant, the displays of the respective computing devices of each of the virtual meeting participants may be controlled by the virtual meeting control unit 400 of FIG. 4 to automatically display what Nancy's computing device is currently displaying.

In some aspects, each participant may be provided with the option prior to the start of a virtual meeting to either automatically allow the virtual meeting control unit 400 to display what their computing device is currently displaying based on a request made by another virtual meeting participant who is currently speaking, or to only allow display of their computing device if the participant gives express authorization at the time the request has been made to allow their display to be shown to the other virtual meeting participants. This may be accomplished, for example, by providing a pop-up window to the participant to whom the request was made to have their display shown to the other virtual meeting participants, whereby the participant may choose to accept the request or deny the request. That way, if the participant is currently reviewing secret or confidential material that should not be shown to at least one other participant of the virtual meeting, that secret or confidential material is not inadvertently displayed to non-authorized parties.

Figure 8:
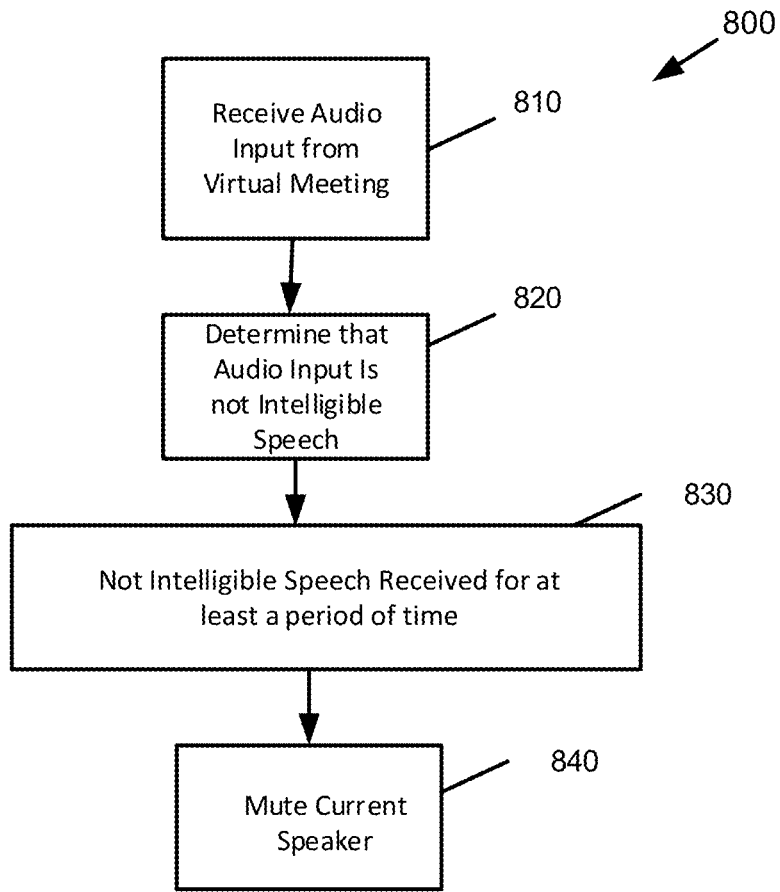
FIG. 8 depicts a flow diagram that illustrates a method that mutes a teleconference attendee based on analyzed speech of that attendee being associated with noise, in accordance with one or more illustrative aspects described herein.

FIG. 8 depicts a flow diagram that illustrates a method 800 that mutes a teleconference attendee based on analyzed speech of that attendee being associated with noise, in accordance with one or more aspects. With reference also to FIG. 4, in step 810, audio input is received from a virtual meeting. For example, the speech synthesis unit 410 of FIG. 4 receives audio input from a video teleconference. In step 820, the audio input is analyzed and determined to not correspond to intelligible speech. For example, the controller 420 of FIG. 4 is not able to detect any legible words within the audio received from a virtual meeting. In step 830, if unintelligible audio has been detected for at least a period of time, such as for at least 10 seconds, then t that the audio received corresponds to noise, and the current speaker's audio is muted in step 840. This may occur due to the current speaker inadvertently allowing background noise to enter into the virtual meeting from his/her speaker, such as a radio playing music nearby where the current speaker is located while attending the virtual meeting. In this case, the detection of unintelligible audio for at least the period of time may result in automatic muting of the current speaker's audio, to thereby enable another virtual meeting participant to start speaking during the virtual meeting. Alternatively, a message may be displayed on a display of the current speaker, informing him/her that excessive noise is be received by the other virtual meeting participants, and to request that the current speaker rectify the problem within a particular time period, e.g., within the next 10 seconds, or otherwise, that participant's audio will be automatically muted. Once muted, the virtual meeting may enable any participant other than the muted participant to speak, to thereby cause that participant to become the current speaker of the virtual meeting.

As illustrated above, various aspects of the disclosure relate to creating events or actions based on audio obtained during a virtual meeting, such as audio obtained during an audio teleconference or audio obtained during a video teleconference. While the subject matter has been described in language specific to structural features and/or methodological acts, it is to be understood that the subject matter defined in the appended claims is not necessarily limited to the specific features or acts described above. For example, when a person is identified as a subject of a current speaker of an ongoing virtual meeting, and an event is also detected, such as the current speaker referring to a particular date and time for the identified person to set up a future virtual meeting or change a date of a virtual meeting that has previously been set up, the meeting engine may parse the existing calendar dates on the identified person's calendar application, to determine if any of those existing calendar dates matches the date referred to by the current speaker. If so, a pop-up window may be provided on the identified person's computer display, to enable to the identified person to make any changes to that meeting based on comments made by the current speaker in the ongoing virtual meeting. Such changes, if made by the identified person, may then be automatically sent to each invitee of the future virtual meeting, as a calendar invite update message.

The specific features and acts described above are described as some example implementations of the following claims.

What is claimed is:

1. A method comprising:
receiving, by a computing device, audio data from a first user of a plurality of users participating in a virtual meeting hosted by a virtual meeting application;
analyzing, by the computing device, the received audio data to identify a second user of the plurality of users, wherein the second user is different from the first user; and
adjusting, by the computing device, a setting of the virtual meeting application in response to the identification of the second user, the adjustment being to enable a device of at least the first user to receive audio originating from a device of the second user so as to facilitate a dialog among two or more users.

2. The method of claim 1, further comprising:
storing, in a memory, a plurality of speech segments, the plurality of speech segments corresponding to names or aliases associated with the plurality of users, respectively.

3. The method of claim 1, wherein the analyzing comprises performing speech synthesis of the received audio data using a named entity recognition algorithm.

4. The method of claim 1, wherein the analyzing comprises performing speech synthesis of the audio data using a natural language processing algorithm.

5. The method of claim 2, further comprising:
performing, when the received audio data is determined to include information matching one of the plurality of speech segments associated with the second user of the plurality of users, further speech synthesis to determine whether the received audio data further includes an interrogatory.

6. The method of claim 1, further comprising:
receiving, from each of the plurality of users participating in the virtual meeting, information associated with names or aliases used by each of the plurality of users; and
storing, in a memory, the names or aliases.

7. The method of claim 5, wherein the interrogatory indicates a request for a future meeting.

8. The method of claim 7, further comprising:
in response to determining that the received audio data includes the interrogatory:
creating a calendar meeting text file; and
sending the calendar meeting text file to a meeting calendar application associated with the second user.

9. The method of claim 8, wherein the calendar meeting text file comprises:
text associated with a description of a meeting to be made by the second user of the plurality of users; and
text associated with a date, start time, and end time of the meeting to be made by the second user of the plurality of users.

10. The method of claim 5, further comprising:
in response to determining that the received audio data includes the interrogatory:
causing, a pop-up window to be provided on a display of the device of the second user; and
including, on the pop-up window, information associated with a task to be performed by the second user based on the interrogatory.

11. The method of claim 1, wherein the adjusting the setting of the virtual meeting application comprises adjusting an audio setting of the device of the second user from being muted to unmuted.

12. The method of claim 2, further comprising:
creating the plurality of speech segments based on speech synthesis of audio data associated with virtual meetings conducted prior to the virtual meeting conducted amongst the plurality of users.

13. An apparatus comprising:
one or more processors; and
a memory storing instructions that, when executed by the one or more processors, cause the apparatus to:
receive audio data associated with a first user of a plurality of users participating in a virtual meeting hosted by a virtual meeting application;
analyze the received audio data to identify a second user of the plurality of users, wherein the second user is different from the first user; and
adjust, in response to the identification of the second user, a setting of the virtual meeting application to enable a device of the at least the first user to receive audio originating from a device of the second user so as to facilitate a dialog among two or more users.

14. The apparatus of claim 13, wherein the instructions, when executed by the one or more processors, further cause the apparatus to:
store, in a memory, a plurality of speech segments, the plurality of speech segments corresponding to names or aliases associated with the plurality of users, respectively.

15. The apparatus of claim 13, wherein the analyzing the received audio data comprises performing speech synthesis using a named entity recognition algorithm.

16. The apparatus of claim 13, wherein the analyzing the received audio data comprises performing speech synthesis using a natural language processing algorithm.

17. The apparatus of claim 14, wherein the instructions, when executed by the one or more processors, further cause the apparatus to:

perform, when the received audio data is determined to include information matching one of the plurality of speech segments associated with the second user, further speech synthesis to determine whether the received audio data further includes an interrogatory.

18. The apparatus of claim 14, wherein the instructions, when executed by the one or more processors, further cause the apparatus to:

receive, from each of the plurality of users, information associated with names or aliases used by each of the plurality of users; and store, in the memory, the names or aliases.

19. A non-transitory computer-readable medium storing instructions that, when executed by one or more processors, cause an apparatus to:

receive audio data associated with a first user of a plurality of users participating in a virtual meeting hosted by a virtual meeting application;

analyze the received audio data to identify a second user of the plurality of users, wherein the second user is different from the first user; and adjust, in response to the identification of the second user, a setting of the virtual meeting application to enable a device of at least the first user to receive audio originating from a device of the second user so as to facilitate a dialog among of two or more users.

20. The non-transitory computer-readable medium according to claim 19, wherein the instructions further cause the apparatus to:

store, in a memory, a plurality of speech segments, the plurality of speech segments corresponding to names or aliases associated with the plurality of users, respectively.

\* \* \* \* \*

UNITED STATES PATENT AND TRADEMARK OFFICE
CERTIFICATE OF CORRECTION

PATENT NO. : 11,271,762 B2
APPLICATION NO. : 16/408591
DATED : March 8, 2022
INVENTOR(S) : Nandikotkur et al.

Page 1 of 1

It is certified that error appears in the above-identified patent and that said Letters Patent is hereby corrected as shown below:

On the Title Page

Item (12), delete "Achyuth et al." and insert --Nandikotkur et al.--

Item (72), Inventors, Line 1, Please delete "Nandikotkur Achyuth" and insert --Achyuth Nandikotkur--

Signed and Sealed this
Twelfth Day of September, 2023

Katherine Kelly Vidal
*Director of the United States Patent and Trademark Office*